US010095186B2

(12) United States Patent
Helder et al.

(10) Patent No.: US 10,095,186 B2
(45) Date of Patent: Oct. 9, 2018

(54) USER INTERFACE ACTIVATION

(71) Applicant: NXP B.V., Eindhoven (NL)

(72) Inventors: Arjen Helder, Cagnes sur Mer (FR); Ko-Min Chang, Heeze (NL); Sammy Geeraerts, Nieuwrode (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/699,498

(22) Filed: Sep. 8, 2017

(65) Prior Publication Data

US 2018/0074462 A1 Mar. 15, 2018

(30) Foreign Application Priority Data

Sep. 14, 2016 (EP) .................................... 16290174

(51) Int. Cl.
| | |
|---|---|
| *G04G 21/02* | (2010.01) |
| *G04B 47/06* | (2006.01) |
| *G06K 9/00* | (2006.01) |
| *G04G 21/08* | (2010.01) |
| *G01V 1/00* | (2006.01) |
| *G01P 13/00* | (2006.01) |
| *G06F 3/0488* | (2013.01) |

(52) U.S. Cl.
CPC .............. *G04B 47/06* (2013.01); *G01P 13/00* (2013.01); *G01V 1/001* (2013.01); *G04G 21/02* (2013.01); *G04G 21/08* (2013.01); *G06F 3/04883* (2013.01); *G06K 9/00355* (2013.01)

(58) Field of Classification Search
CPC ........ G04G 21/02; G04G 21/08; G01P 13/00; G06F 3/04883; G04B 47/06
See application file for complete search history.

(56) References Cited

U.S. PATENT DOCUMENTS

| | | | | |
|---|---|---|---|---|
| 5,946,274 | A | * | 8/1999 | Yamaguchi ............ G04C 3/001 307/116 |
| 7,010,098 | B2 | | 3/2006 | Moquin et al. |
| 7,679,996 | B2 | | 3/2010 | Gross |
| 8,344,998 | B2 | | 1/2013 | Fitzgerald et al. |
| 8,907,929 | B2 | | 12/2014 | Li et al. |
| 9,477,313 | B2 | * | 10/2016 | Mistry .................... G06F 3/014 |
| 2002/0028699 | A1 | | 3/2002 | Moquin et al. |

(Continued)

FOREIGN PATENT DOCUMENTS

WO    WO-2015/099968 A1    7/2015

OTHER PUBLICATIONS

Liu, Yen-Ting et al; "SoundSense: 3D Gesture Sensing using Ultrasound on Mobile Devices"; 7 pages retreived from the internet mroz.github.io/files/soundsense.pdf.

*Primary Examiner* — Sean Kayes

(57) ABSTRACT

A wrist watch and method of activating a user interface of the wrist watch are described. The wrist watch comprises a display for providing a user interface for a user when wearing the wrist watch on a wrist, a first motion sensor arranged to detect motion of the wrist watch and a proximity detector arranged to detect the proximity of a hand of the user when wearing the wrist watch. A data processor is configured to activate the user interface when the first motion sensor detects that the wrist of the user has been raised and the proximity detector detects that the hand of the user has moved toward the wrist watch.

15 Claims, 3 Drawing Sheets

(56) References Cited

U.S. PATENT DOCUMENTS

| | | | |
|---|---|---|---|
| 2010/0306718 A1* | 12/2010 | Shim | G06F 3/04883 715/863 |
| 2012/0235790 A1* | 9/2012 | Zhao | G06F 21/32 340/5.83 |
| 2012/0280917 A1* | 11/2012 | Toksvig | G06F 1/1626 345/173 |
| 2014/0125619 A1* | 5/2014 | Panther | G06F 3/04883 345/173 |
| 2014/0160078 A1* | 6/2014 | Seo | G06F 3/017 345/175 |
| 2014/0275852 A1* | 9/2014 | Hong | A61B 5/02427 600/301 |
| 2014/0275854 A1* | 9/2014 | Venkatraman | A61B 5/721 600/301 |
| 2014/0292641 A1* | 10/2014 | Cho | G06F 3/012 345/156 |
| 2015/0009784 A1 | 1/2015 | Cho et al. | |
| 2015/0092520 A1 | 4/2015 | Robison et al. | |
| 2015/0185837 A1 | 7/2015 | Whitney et al. | |
| 2016/0004393 A1* | 1/2016 | Faaborg | G06F 3/0482 715/765 |
| 2016/0018900 A1 | 1/2016 | Tu et al. | |
| 2017/0357215 A1* | 12/2017 | Shim | G06F 1/163 |
| 2018/0157401 A1* | 6/2018 | Cauwels | G06F 1/163 |

\* cited by examiner

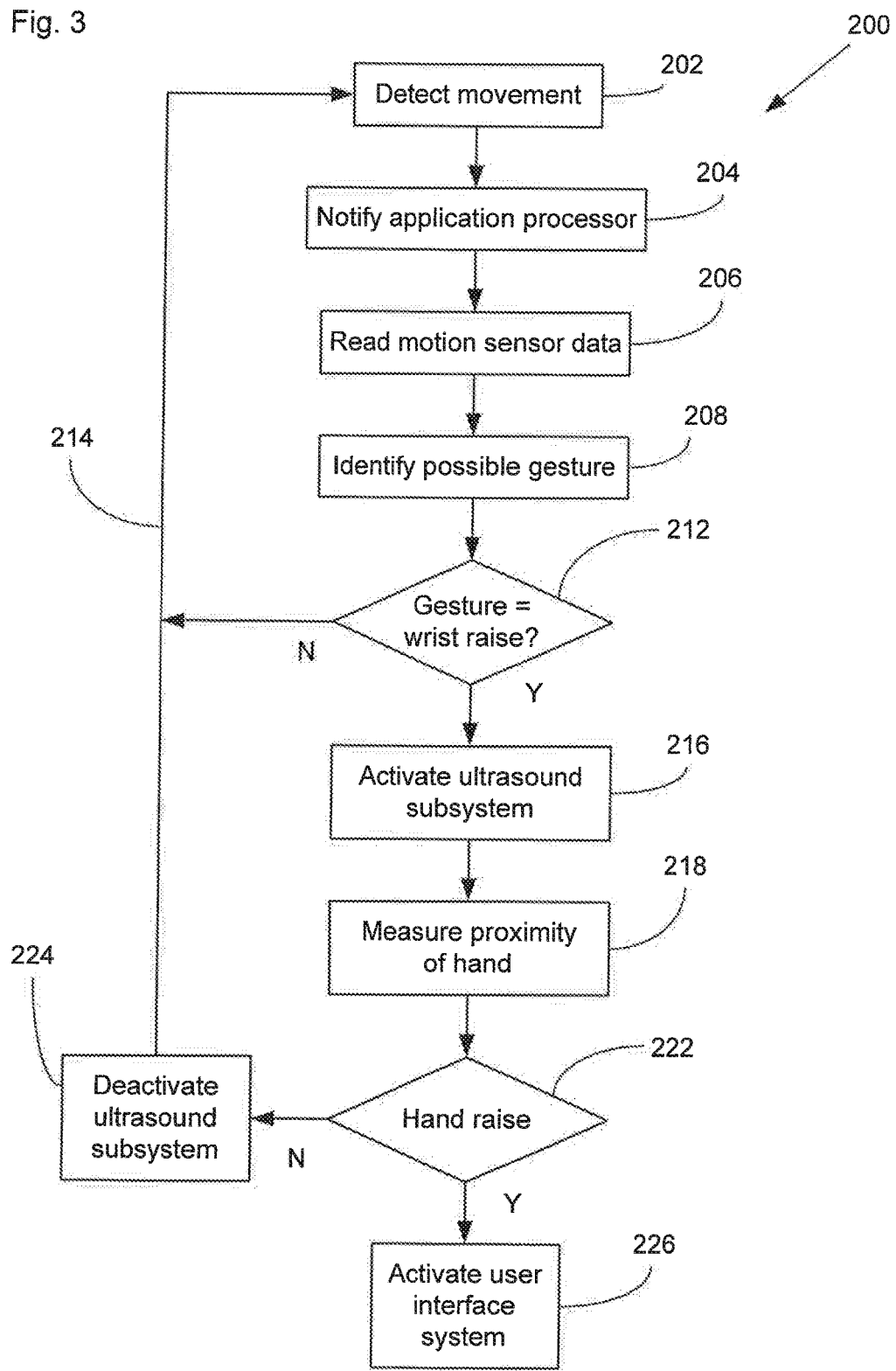

USER INTERFACE ACTIVATION

CROSS-REFERENCE TO RELATED APPLICATIONS

This application claims the priority under 35 U.S.C. § 119 of European patent application no. 16290174.8, filed Sep. 14, 2016 the contents of which are incorporated by reference herein.

The present specification relates to user interface activation and in particular to activating the user interface of a wrist watch.

The effective management of electrical power consumption is especially important for portable electronic devices which use batteries or other storage devices to store electrical power. This is particularly the case for smaller electronic devices as their batteries may need to be smaller which makes it more difficult to store large amounts of electrical power. Hence, one approach to electrical power management is to put the electrical device into a lower power mode of operation, or partially shut down the electrical device, such as a sleep mode or standby mode, or ultimately to fully shut down the electrical device.

However, if the electrical device is fully shut down then significant power may be used when the user next turns on the device and the device re-boots. Even returning the device back to its full power mode of operation from a lower power or standby mode will also consume some electrical power.

Also, in a lower power mode or standby mode, the user may need to interact with the device in some way in order to return the device back to its full power mode of operation. It may be preferably for the user interaction required to return the electrical device to full power mode to be relatively simple so that the user can easily and quickly return the device to its full power mode and start using the device.

On the other hand, a simple user interaction may also result in the user unintentionally returning the device to full power mode and wasting electrical power in accidentally returning the device to full power mode. The more frequently this happens, the greater the wasted electrical power.

Hence, there are competing considerations in balancing power management of electrical devices with efficiency of user interaction with electrical devices.

Hence, an electrical device which manages to combine good power management and efficient user interaction may be beneficial.

According to a first aspect of the present disclosure, there is provided a wrist watch comprising: a display for providing a user interface for a user when wearing the wrist watch on a wrist; a first motion sensor arranged to detect motion of the wrist watch; a proximity detector arranged to detect the proximity of a hand of the user when wearing the wrist watch; and a data processor, wherein the data processor is configured to activate the user interface when the first motion sensor detects that the wrist of the user has been raised and the proximity detector detects that the hand of the user has moved toward the wrist watch.

Detecting raising of the user's wrist and movement of the user's hand toward the wrist watch so as to trigger activation of a user interface may help to reduce electrical power consumption.

In one or more embodiments, the data processor may be configured to activate the user interface when the first motion sensor detects that the wrist of the user has been raised and the proximity detector detects that the hand of the user has moved toward the wrist watch after the first motion sensor has detected that the wrist of the user has been raised.

In one or more embodiments, the proximity detector may be an ultrasound system.

In one or more embodiments, the ultrasound system may include a speaker and a microphone and the ultrasound system may be configured to drive the speaker to generate an ultrasound signal and the microphone may be configured to output a microphone signal responsive to detecting the ultrasound signal.

In one or more embodiments, the wrist watch may include a casing and the speaker and the microphone both may be arranged at a side edge of the casing.

In one or more embodiments, the ultrasound system may include a digital audio processor in communication with the speaker and the microphone and may be configured to determine proximity based on time of flight of an ultrasound signal generated by the speaker and detected by the microphone.

In one or more embodiments, the data processor may be further configured to determine whether the wrist of the user has been raised.

In one or more embodiments, the data processor may be further configured to activate the proximity detector after it has been determined that the wrist of the user has been raised.

In one or more embodiments, the data processor may be configured to determine whether the wrist of the user has been raised by: receiving motion sensor data from the first motion sensor, identifying a possible gesture of the user; and determining whether the possible gesture corresponds to raising the wrist of the user.

In one or more embodiments, the data processor may be further configured to determine whether the hand of the user has been moved toward the wrist watch.

In one or more embodiments, the data processor may be configured to determine whether the hand of the user has been moved toward the wrist watch by: receiving proximity data from the proximity detector, and determining from the proximity data whether the user's hand has moved closer to the wrist watch.

In one or more embodiments, the wrist watch may include a second motion sensor arranged to detect motion of the wrist watch, and the data processor may be configured to activate the user interface when the first motion sensor and the second motion sensor are used to detect that the wrist of the user has been raised.

In one or more embodiments, the first motion sensor and/or the second motion sensor may be an accelerometer or a gyroscope.

In one or more embodiments, the display may be a touch screen display arranged to provide user input to a user interface displayed by the display.

According to a second aspect of the present disclosure, there is provided a method for activating a user interface of a wrist watch worn on a wrist of a user, comprising: detecting motion of the wrist watch; detecting the proximity of a hand of the user to the wrist watch; and activating a user interface of the wrist watch when it is determined that the wrist of the user has been raised and that the hand of the user has moved toward the wristwatch.

Features of the first aspect may also be counterpart features for the second aspect.

BRIEF DESCRIPTION OF DRAWINGS

An embodiments of the invention will now be described in detail, by way of example only, and with reference to the accompanying drawings, in which:

FIG. 3 shows a process flow chart illustrating a method of operation of the wrist watch.

Similar items in the different Figures share like reference signs unless indicated otherwise.

Figure 1:
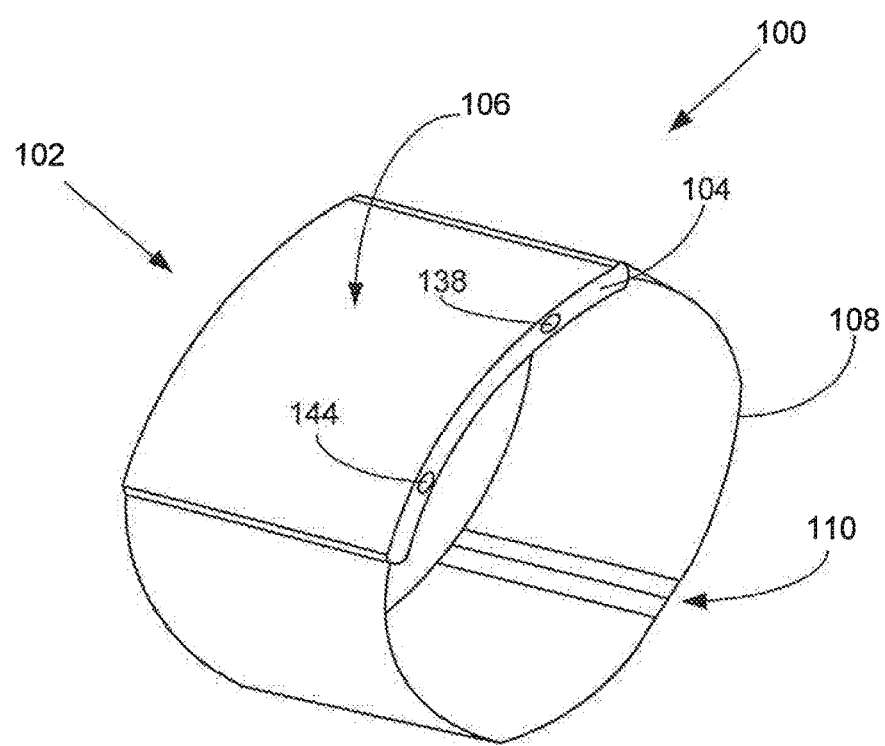
FIG. 1 shows a schematic perspective view of a wrist watch.

With reference to FIG. 1, there is shown a perspective view of a wrist watch 100 for wearing on the wrist of a user. The wrist watch 100 may be a smart watch. Smart watches are generally known in the art. As well as providing time keeping, they typically have sufficient computing or data processing resources to be able to provide other functionalities in addition to timekeeping. For example, the smart watch may have sufficient data processing or computing power to allow one or more software applications to be run on the smart watch. The smart watch may also be able to interact or communicate, in a wired or wireless manner, with other data processing or computing devices, such as a smart phone, to enable various telecommunications functions, such as email, messaging and/or telephony.

Wrist watch 100 generally includes a main body 102 having a housing or casing 104 and a display 106, which may be in the form of a touch screen display. A bracelet 108 may be attached to the main body 104 and may include a fastener or clasp 110 using which the wrist watch 100 may be attached around the wrist of a user. In other embodiments, display 106 may not be a touch screen display and the wrist watch 100 may include one or more physical buttons or other user input devices by which the user can interact with and/or control the wrist watch.

Figure 2:
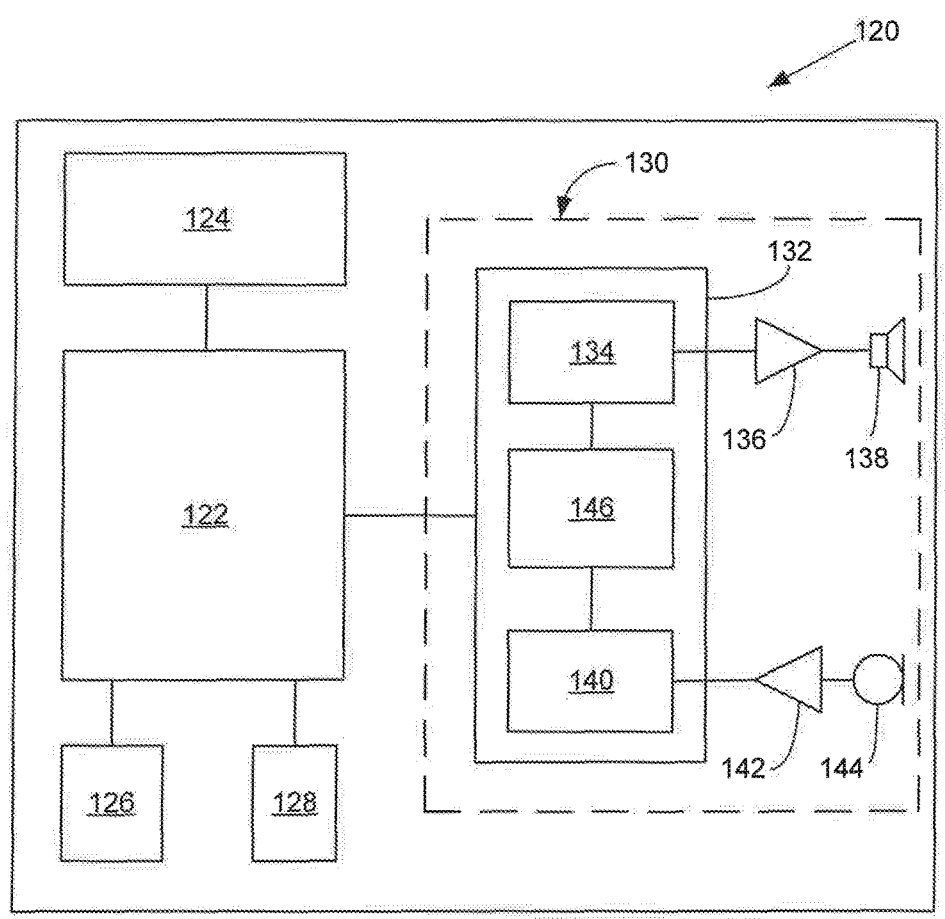
FIG. 2 shows a schematic block diagram of the wrist watch of FIG. 1.

With reference to FIG. 2, there is shown a schematic block diagram 120 of the wrist watch 100 in the form of a smart watch. The smart watch 120 includes an application processor 122 and a display 124. The application processor 122 is sufficiently powerful to run an operating system and one or more applications as well as a user interface which is displayed on display 124 and via which a user may interact using various taps and swipes, as generally known in the art, in order to interact with the smart watch 120. The smart watch 120 also includes at least a first motion sensor 126 in communication with the application processor 122. The smart watch 120 may also include a second motion sensor 128 also in communication with the application processor 122. The first 126, and optionally second 128, motion sensors may each be in the form of an accelerometer or gyroscope or similar devices which can be used to detect the movement of the wrist watch 120 and output a signal indicative of that movement. In one embodiment, the first motion sensor 126 is an accelerometer and the second motion sensor 128 is a gyroscope.

The smart watch also includes a proximity detector 130 in the form of an ultrasound system which includes a digital audio system on a chip 132. The digital audio system on a chip 132 includes an audio codec and digital to analog converter 134 having an output connected to an analog amplifier 136 whose output is attached to and can drive a speaker 138. Digital audio system on a chip 132 also includes an audio codec and analog to digital converter 140 whose input is attached to the output of a further analog amplifier 142, the input of which is attached to the output of a microphone 144. A digital audio processor 146 is also provided. The digital audio system on a chip 132 is in communication with the application processor 122 and outputs a signal indicating the detected proximity of an object to the smart phone.

The digital audio processor 146 is configured to control the audio codec/DAC 134 to drive the loud speaker 138 to output an ultrasound signal. The microphone 144 is arranged to detect any ultrasound signal and generate an output microphone signal which is amplified by amplifier 142 and processed by audio codec/ADC 140 to provide an input to digital audio processor 146. Digital audio processor 146 is configured to determine and output a measure of the proximity of an item to the wrist watch based on a time of flight measurement of ultrasound signals transmitted by the loudspeaker 138, reflected by an object and received by the microphone 144.

As best illustrated in FIG. 1, the speaker 138 and microphone 144 are located proximate a side edge of the casing of the wrist watch 100. Hence, when worn by a user on the wrist, the speaker 138 and microphone 144 are directed toward a hand of the user.

The smart watch circuitry 120 will also include other devices and components which are generally known to a person of ordinary skill in the art and are not shown in FIG. 2 so as not to obscure the operation of the system.

As explained in greater detail below, application processor 122 is configured, by suitable software instructions or otherwise, to carry out a method to control activation of a user interface of the smart watch 100. In a low power mode of operation, smart watch 100 may display a watch face which may be of analog or digital form. In this state, some or many of the other parts of the smart watch may be powered down so as to reduce power consumption. Using the motion sensors 126, 128, the application processor 122 can determine when a movement of the smart watch corresponding to a user lifting the wrist upward, for example so as to view the watch face, has been detected. The ultrasound system 130 then acts as a proximity detector to detect whether the user then also moves their hand toward the wrist watch, as some people may commonly do when checking the time. If a movement of the wrist upward is detected followed by movement of the hand toward the wrist watch, then application processor 122 automatically activates the user interface of the smart watch and may also start returning the smart watch to a higher power mode of operation.

It is believed that the combination of detecting raising of the user's wrist and subsequent movement of the user's hand toward the smart watch improves the reliability of detection of user actions indicating intended use of the smart watch. It will be appreciated that if the smart watch is worn with the display 106 on the top of the user's wrist then it is the rear of the user's hand which will move toward the smart watch. If the smart watch is worn with the display 106 on the underside of the user's wrist, then it would be the palm of the user's hand which would be detected moving closer to the smart watch.

It is believed that in this way, false positive activations of the user interface may be reduced. For example, if the user simply raises their arm, for example to point, without a subsequent movement of the hand toward the smart watch, then the user interface will not be activated. Similarly, if the user flexes their hand and moves their hand toward the smart watch, without a preceding wrist raising movement having been detected, then the user interface will not be activated. Hence, the combination of detecting raising of the user's wrist and movement of the user's hand is better able to discriminate between intentional and unintentional activations of the user interface.

FIG. 3 shows a process flow chart corresponding to a method 200 of activating a user interface of a wrist watch 100. It is assumed that initially the smart watch 100 is in a low power state so as to reduce its consumption of electrical energy. At 202, either or both of the first 126 and second 128 motion detectors may detect movement of the wrist watch. The motion sensors 126 and 128 send respective signals to the application processor 122 notifying the application processor that movement of the smart watch has been detected. At 206, the application processor 122 receives and reads data streams of motion sensor data from the motion sensors 126 and 128. At 208, the application processor 122 then processes the streams of motion sensor data to identify a possible gesture of the user using one or more data processing algorithms. For example, the data processor may use a pattern matching technique to compare the streams or motion sensor data with motion sensor data corresponding to known gestures. A gesture can then be identified if a current portion of the stream of motion sensor data is sufficiently similar to motion sensor data for a known gesture.

Then at step 212, the application processor 122 determines whether a currently identified gesture of the user corresponds to the user raising their wrist. If at 212 it is determined that the current gesture of the user does not correspond to the user raising their wrist then processing returns, as illustrated by process flow line 214, to step 202 and the process can repeat.

Alternatively, if at 212 it is determined that a wrist raising gesture has occurred, then processing proceeds to step 216. At step 216, the application processor issues a signal to the proximity detection system 130 to activate the ultrasound subsystem. The digital audio processor 146 issues various signals which cause an ultrasound signal to be output by speaker 138. The speaker can output simple pulses of ultrasound or chirped pulses of ultrasound to reduce peak power and also to help decrease non-linearities of the system.

Microphone 144 can detect ultrasound signals and in particular ultrasound signals reflected off the user's hand, and then supplies a signal via amplifier 142 to codec/ADC 140. As discussed above, the digital audio processor 146 is configured to determine the proximity of an object based on time of flight measurements of ultrasound transmitted by loudspeaker 138 and received by microphone 144. Hence, at 218, the digital audio processor 146 measures the proximity of the user's hand and outputs a signal indicative of a measure of the proximity of the user's hand to the application processor 122.

At 222, the application processor 122, based on the measured proximity of the user's hand determines whether the movement of the user's hand corresponds to the user's hand moving closer to the wrist watch or not. For example, at 222, the application processor may determine that the user's hand has been raised and has moved closer to the wrist watch based on the measured distance to the user's hand being less than a threshold value, for example, approximately 2 cm. If at 222 no hand raise is determined to have occurred, then processing proceeds to step 224 and the ultrasound subsystem can be deactivated at 224 to further conserve energy. Processing then returns as illustrated by process flow line 214 back to 202 and the process can repeat.

Alternatively, if at 222 the application processor determines that a hand raise has occurred, then processing proceeds to 226 and the application processor can issue an instruction or control signal to activate the user interface system of the smart watch 100 and also to start to power up other parts of the smart watch in anticipation of user interaction with and use of the smart watch. The user may then proceed to use the smart watch 100 in a conventional manner. Method 200 may be invoked again the next time that the smart watch has returned to a low power state.

Hence, the smart watch method of operation detects the natural movement of the wrist and hand of the user who is wearing it as occurring in two phases. A first phase is the movement of raising the wrist which is detected by the motion sensors. The second phase is the raising of the hand slightly towards the smart watch which is detected by ultrasonic transducers located at the side of the body of the smart watch.

For smart watches which already include a speaker and a microphone, e.g. for telephony and/or audio input/output purposes, then no additional hardware components may be required in order to implement the method. Rather, all that is required is additional functionality implemented in the digital audio processor in order to use the speaker and microphone as an ultrasound proximity detector and also additional software for the application processor to detect the first and second phases of movement and to activate the user interface.

Hence, when the user is not interacting with the smart watch, many or the majority of smart watch components may be powered down to save power. In order to anticipate that the user intends to start reusing the smart watch, the system and method provide an accurate way of determining the user's behaviour in order to automatically activate the user interface.

The method of operation is based on sensing the natural movement of the user's hand and wrist when the user is directing the smart watch into their line of sight. Firstly raising the wrist is detected by the motion sensors which then activate the ultrasound system. The speaker, microphone and audio data processor then detect the second movement of the user's hand. When the motion sensor detects a raising of the wrist and subsequently the ultrasound system detects the raising of the back of the hand, the user interface and the display of the smart watch can be activated. However, when the motion sensor detects a raising of the wrist but the ultrasound system does not detect the raising of the back of the hand, it may be assumed that the user does not want to interact with the smart watch, and the user interface and the display of the smart watch remain in the powered down mode in order to save battery life. Further, when the motion sensor does not detect a raising of the wrist, the ultrasound system is not activated and so any movement of the back of the hand toward the watch is not detected and hence the user interface and display of the smart watch remain in a powered down mode in order to save battery life.

Hence, this approach of combining motion sensor data and proximity detection of the user's hand toward the smart watch greatly enhances the certainty that the user intends to interact with the smart watch. Therefore, this approach reduces the number of false positive user interface activations which might otherwise reduce the energy level of the smart watch battery.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Any instructions and/or flowchart steps can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

While the disclosure is amenable to various modifications and alternative forms, specifics thereof have been shown by way of example in the drawings and described in detail. It should be understood, however, that other embodiments, beyond the particular embodiments described, are possible as well. All modifications, equivalents, and alternative embodiments falling within the scope of the appended claims are covered as well.

The invention claimed is:

1. A wrist watch comprising:
   a display for providing a user interface for a user when wearing the wrist watch on a wrist;
   a first motion sensor arranged to detect motion of the wrist watch;
   a proximity detector arranged to detect the proximity of a hand of the user when wearing the wrist watch; and
   a data processor, wherein the data processor is configured to activate the user interface when the first motion sensor detects that the wrist of the user has been raised and the proximity detector detects that the hand of the user has moved toward the wrist watch.

2. The wrist watch as claimed in claim 1, wherein the data processor is configured to activate the user interface when the first motion sensor detects that the wrist of the user has been raised and the proximity detector detects that the hand of the user has moved toward the wrist watch after the first motion sensor has detected that the wrist of the user has been raised.

3. The wrist watch as claimed in claim 1, wherein the proximity detector is an ultrasound system.

4. The wrist watch as claimed in claim 3, wherein the ultrasound system includes a speaker and a microphone and wherein the ultrasound system is configured to drive the speaker to generate an ultrasound signal and the microphone is configured to output a microphone signal responsive to detecting the ultrasound signal.

5. The wrist watch as claimed in claim 4, wherein the wrist watch includes a casing and the speaker and the microphone are both arranged at a side edge of the casing.

6. The wrist watch as claimed in claim 4, wherein the ultrasound system includes a digital audio processor in communication with the speaker and the microphone and configured to determine proximity based on time of flight of an ultrasound signal generated by the speaker and detected by the microphone.

7. The wrist watch as claimed in claim 1, wherein the data processor is further configured to determine whether the wrist of the user has been raised.

8. The wrist watch as claimed in claim 7, wherein the data processor is further configured to activate the proximity detector after it has been determined that the wrist of the user has been raised.

9. The wrist watch as claimed in claim 7, wherein the data processor is configured to determine whether the wrist of the user has been raised by:
   receiving motion sensor data from the first motion sensor;
   identifying a possible gesture of the user; and
   determining whether the possible gesture corresponds to raising the wrist of the user.

10. The wrist watch as claimed in claim 1, wherein the data processor is further configured to determine whether the hand of the user has been moved toward the wrist watch.

11. The wrist watch as claimed in claim 10, wherein the data processor is configured to determine whether the hand of the user has been moved toward the wrist watch by:
    receiving proximity data from the proximity detector; and
    determining from the proximity data whether the user's hand has moved closer to the wrist watch.

12. The wrist watch as claimed in claim 1, wherein the wrist watch includes a second motion sensor arranged to detect motion of the wrist watch, and wherein the data processor is configured to activate the user interface when the first motion sensor and the second motion sensor are used to detect that the wrist of the user has been raised.

13. The wrist watch as claimed in claim 1, wherein the first motion sensor is an accelerometer and the second motion sensor is a gyroscope.

14. The wrist watch as claimed in claim 1, wherein the display is a touch screen display arranged to provide user input to a user interface displayed by the display.

15. A method for activating a user interface of a wrist watch worn on a wrist of a user, comprising:
    detecting motion of the wrist watch;
    detecting the proximity of a hand of the user to the wrist watch; and
    activating a user interface of the wrist watch when it is determined that the wrist of the user has been raised and that the hand of the user has moved toward the wrist watch.

* * * * *